United States Patent
Chang et al.

[11] Patent Number: 6,163,355
[45] Date of Patent: Dec. 19, 2000

[54] IN-PLANE SWITCHING ARRAY OF TFT LIQUID CRYSTAL DISPLAY IN WHICH AN ELECTRODE ON THE SAME SIDE OF AN INSULATING LAYER IS MADE THINNER THAN THE SOURCE AND DRAIN

[75] Inventors: Shih-Chang Chang, Taoyuan Hsien; Jr-Hong Chen, Hsinchu hsien; Biing-Der Liu, Taipei, all of Taiwan

[73] Assignee: Industrial Technology Research Institute

[21] Appl. No.: 09/211,775

[22] Filed: Dec. 14, 1998

[51] Int. Cl.⁷ .................................................. G02F 1/1343
[52] U.S. Cl. ................................................................ 349/141
[58] Field of Search ................................................. 349/141

[56] References Cited

U.S. PATENT DOCUMENTS 5,734,451  3/1998  Yanagawa et al. ...................... 349/43
5,986,735  11/1999  Komatsu .................................. 349/141
6,091,473  7/2000  Hebiguchi ............................... 349/141

*Primary Examiner*—Walter J. Malinowski

[57] ABSTRACT

A process for manufacturing an in-plane switching array of a liquid crystal display. A thin-film transistor including a drain, a source and a data line as well as first and second electrodes are fabricated on a cleaned glass substrate. The source, the drain and the data line comprise the same conductive layer as the second electrode. The conductive layer includes a top aluminum layer and a bottom Cr layer. A photo-resist layer is coated and patterned to expose only the area of the second electrode. The top aluminum layer of the second electrode is then etched away to decrease the thickness. Because of the thinner second electrode, the rubbing process can be uniformly completed. The light leak near the edge of the electrode is reduced without increasing the resistance of the data line.

9 Claims, 2 Drawing Sheets

IN-PLANE SWITCHING ARRAY OF TFT LIQUID CRYSTAL DISPLAY IN WHICH AN ELECTRODE ON THE SAME SIDE OF AN INSULATING LAYER IS MADE THINNER THAN THE SOURCE AND DRAIN

FIELD OF THE INVENTION

The present invention relates generally to the fabrication of liquid crystal displays, and more specifically to the device structure and the manufacturing process of the in-plane switching array of a thin-film-transistor liquid crystal display.

BACKGROUND OF THE INVENTION

Liquid crystal displays (LCD) have been widely used in many different applications in recent years. Because of the light weight and small volume, most of notebook or lab-top computers use LCDs as their video monitors. An LCD manufactured with a thin-film transistor (TFT) array provides a video monitor with high solution, rich colors and fast response.

An LCD relies on the orientation of the liquid crystal positioned between the two glass substrates to pass or block light of each pixel on the display. In a twisted-nematic (TN) mode, the orientation of the liquid crystal is controlled by the voltage difference between the transparent upper and lower electrodes of each display pixel. By changing the voltages applied to the electrodes, the liquid crystals can be aligned differently for different pixels to provide various pixel intensities in an image.

LCD manufacturers have been trying to manufacture larger LCDs to replace the conventional cathode-ray tube (CRT) display monitors of desk-top computers. Due to the birefringence effect in a twisted-nematic LCD, the viewing angle is limited to a small range that is not acceptable in a larger display monitor.

In-plane switching (IPS) is one of more recent technologies that have been used in manufacturing TFT LCDs. In the in-plane switching technology, the parallel electric field applied to the comb-shaped electrodes formed on the lower glass substrate of the LCD orients the liquid crystals. As compared to a TN LCD, an IPS LCD has a wider viewing angle. 13.3" and 14.1" IPS LCDs with SVGA(800× RGB×600) or XGA(1024×RGB×768) resolution have been manufactured for the video monitors of desk-top computers.

FIG. 1 shows the conventional process of fabricating an IPS array in an LCD. In the conventional process, a glass substrate 101 is first prepared. A first layer of Cr, a layer of Mo and a second layer of Cr are coated on the glass substrate 101 by using a sputtering technique after it is cleaned. These metal layers form the M1 layer of the LCD. By patterning and wet-etching these layers, the gate 102, the scan line and the common line (not shown in the cross sectional view) are formed on the glass substrate 101.

An SiNx layer 105, an a-Si:H layer 106 and an n$^+$a-Si:H layer 107 are then deposited on top of the structure that has been formed on the glass substrate as shown in FIG. 1(B). An ITO layer 108 is coated on top of the LCD structure formed so far. Only the peripheral area that needs to be wired is patterned to form pads for attaching TABs. A contact hole is formed for connecting M1 and M2 layers.

A Cr layer and an aluminum layer that constitute the M2 layer are then coated. The source 109 and the drain 110 of the TFT as well as the data line (not shown in the cross-sectional view) of the LCD are patterned using photo-resist. After removing the photo-resist, the M2 layer is used as a hard mask for etching the n$^+$a-Si:H layer through back-channel etching.

A SiNx layer is deposited as a passivation layer. On the passivation layer, only the peripheral area for wiring is opened and the pixel area remains covered. The IPS device is thus formed as shown in FIG. 1(C).

One of the problems in the conventional process is related to the thickness of the M2 layer. It has been observed that on the edge of the M2 layer electrodes, light leaks significantly after the LCD is packaged. The M2 layer generally comprises 500 angstroms thick of Cr and 6000 angstroms thick of Al. Because the electrode is formed with the thick M2 layer, near the electrode edge back to the rubbing direction, the area can not be well rubbed in a rubbing process.

The insufficient rubbing results in the fact that the liquid crystal can not be oriented appropriately during the normal operation of the LCD. Consequently, it causes light leak. The contrast of the LCD is thus greatly decreased and the quality of the display is degraded.

Although the light leak problem may be reduced by decreasing the thickness of the M2 layer, it is found that the light leak can not be completely eliminated. In addition, decreasing M2 layer's thickness increases the resistance of the data line that slows the response of the LCD.

SUMMARY OF THE INVENTION

This invention has been made to overcome the above mentioned light leak problem and to reduce the resistance on the data line of an IPS LCD. The primary object of the invention is to provide a new IPS LCD structure that has an IPS electrode thinner than the M2 layer of the TFT and the data line so as to reduce the light leak on the edge of the electrode without increasing the resistance of the data line. Another object is to provide a process of manufacturing an IPS LCD that has low light leak, high contrast as well as low data line resistance.

According to the present invention, after the upper metal (M2) layer of the conventional process has been formed for the source, the drain, the data line and the comb-shaped electrodes, an additional photo-lithographic process is performed to expose the area of the comb-shaped electrode. The M2 layer which actually comprises two metal layers is covered with another photo-resist layer, exposed to the light with a photo-mask, and etched to remove the top metal layer. The bottom metal layer is left after the process.

The IPS LCD of this invention reduces the thickness of the comb-shaped electrode and improves rubbing effect to reduce light leak. In addition, the thickness of the data line is not decreased. The resistance of the data line remains low to meet the requirement of the driver circuit of the LCD.

The foregoing and other objects, features, aspects and advantages of the present invention will become more apparent from a careful reading of a detailed description provided herein below, with appropriate reference to the accompanying drawings.

DETAILED DESCRIPTION OF THE PREFERRED EMBODIMENTS

Figure 1:
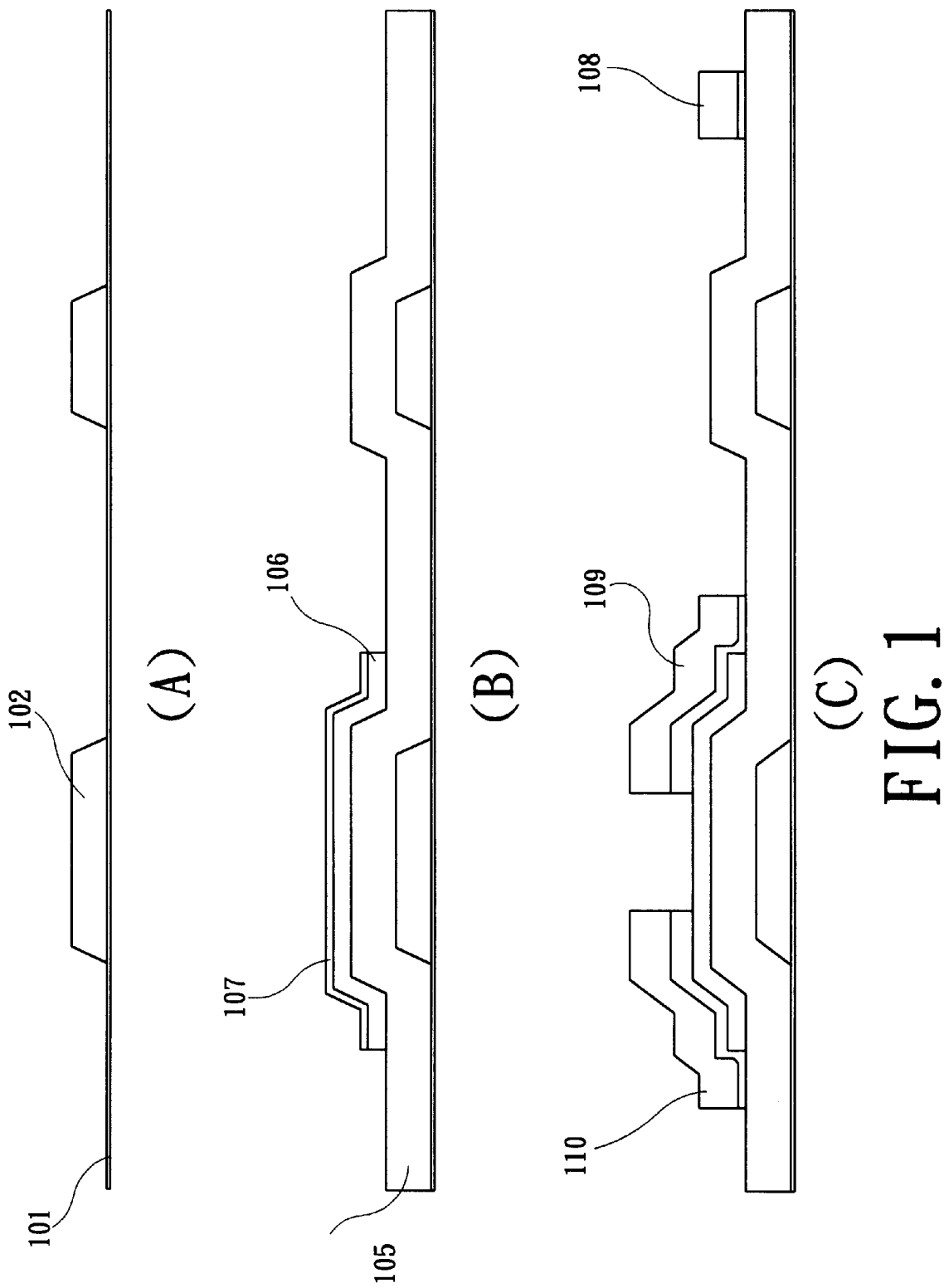
FIGS. 1A–1C shows the cross-sectional views of a conventional in-plane switching liquid crystal display during the process of fabrication.
Figure 2:
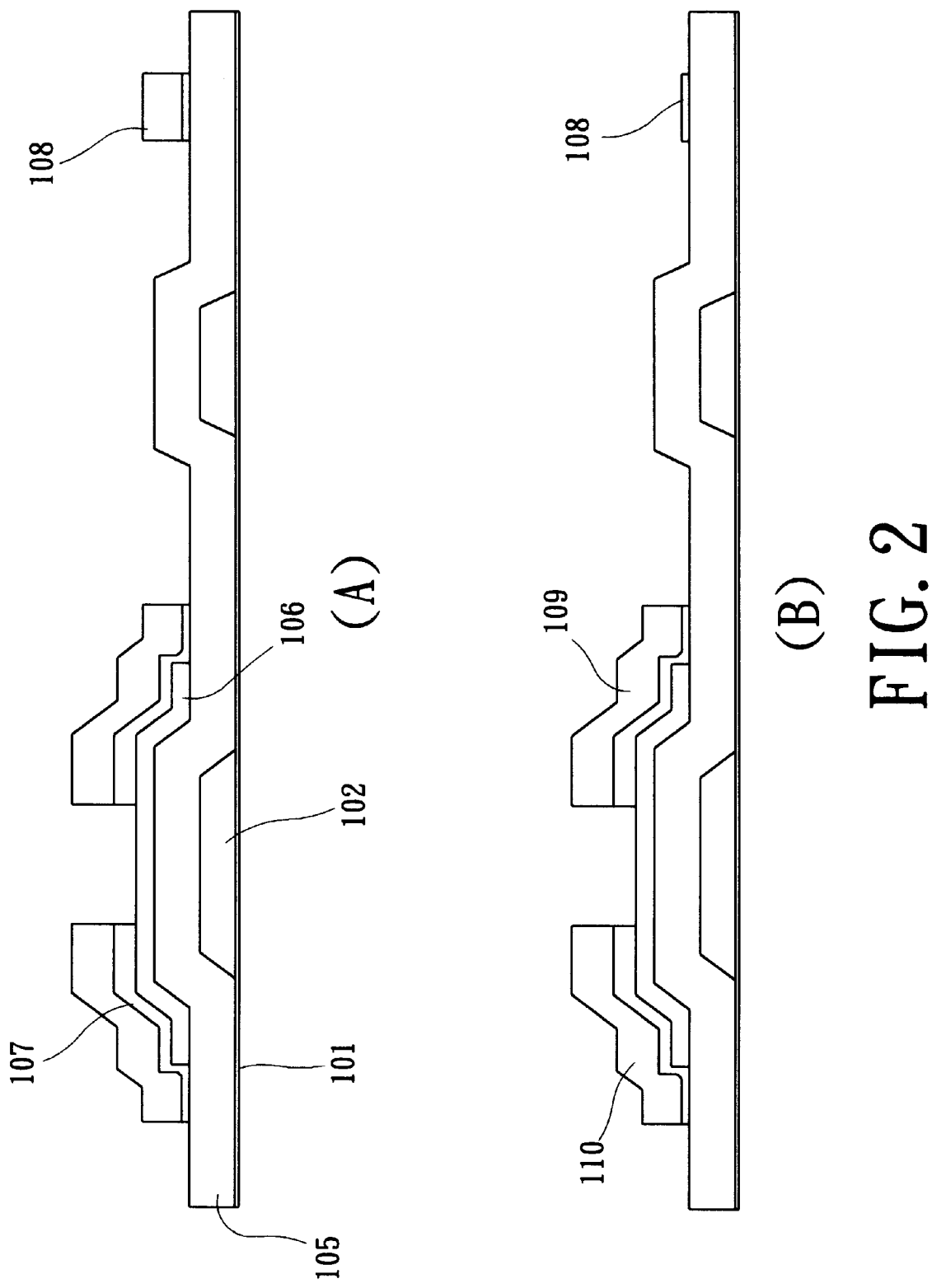
FIGS. 2A–2B shows the cross-sectional views of an in-plane switching liquid crystal display according to this invention.

With reference to FIG. 2, the process of manufacturing the IPS array of an LCD in the present invention is illustrated.

The earlier process of manufacturing the IPS array as shown in FIG. 2(A) is similar to that of a conventional process. A TFT structure as well as comb-shaped electrodes of a conventional IPS array are fabricated on top of a glass substrate 101.

A first layer of Cr approximately 2000 angstroms, a layer of Mo approximately 35 angstroms, and a second layer of Cr approximately 100 angstroms are coated on a cleaned glass substrate 101. These Mo and Cr layers are patterned and etched to form the gate 102 of the TFT, the scan line and the common line (not shown in the cross-sectional view) of the LCD.

Above the Cr layer is an SiN layer 105 approximately 3000–4000 angstroms, an a-Si:H layer 106 approximately 1000–2000 angstroms and an n$^+$a-Si:H layer 107 approximately 200–500 angstroms. The layers are patterned to form island structures. An ITO layer 108 of approximately 1000 angstroms is coated and patterned for wiring in the peripheral area. A contact window is also opened for connecting M1 and M2 layers.

An upper metal layer (M2) comprising a bottom Cr layer of about 500–1000 angstroms, preferably 500 angstroms, and a top aluminum layer of about 1000–8000 angstroms, preferably 6000 angstroms, are coated and patterned to form the source 109 and the drain 110 of the TFT as well as the data line of the LCD. The n$^+$a-Si:H layer in the contact hole area is also removed by back-channel etching.

According to this invention, after the device structure as shown in FIG. 2(A) is prepared, the upper metal layer M2 is further coated with a photo-resist layer. The photo-resist layer is then patterned to expose only the area corresponding to the comb-shaped electrode. A photo-lithographic technique is then used to pattern and etch away the top Cr layer in the M2 layer, leaving an comb-shaped electrode having only the bottom Al layer.

The two electrodes that control the orientation of liquid crystals for each pixel are substantially on a same plane in parallel with the lower glass substrate. Thus, the voltage difference across the two electrodes forms an electric field literally in parallel with the glass substrate to orient the liquid crystals with different angles for generating different gray levels.

Because the comb-shaped electrode for the IPS only comprises a Cr layer of approximately 500 angstroms, its thickness is greatly reduced as compared to the conventional IPS structure. The rubbing process can be accomplished effectively. The light leak near the edge of the electrode is significantly reduced.

Accordingly, the data line formed in the M2 layer remains unchanged although the thickness of the electrode has been reduced. Therefore, the resistance of the data line is not increased. The requirement imposed by the driver circuit of a conventional IPS LCD is still met.

In the above description, the top and bottom metal layers forming the M2 layer are deposited, patterned and etched together to form the source, the drain, the data line and the comb-shaped electrode before the additional step of etching away the top metal layer in the comb-sharped electrode.

It is also possible to deposit and pattern the top and bottom metal layers separately. The bottom metal layer is first deposited, patterned and etched to form the lower part of the source, the drain and the data line as well as the desired thin comb-shaped electrode. The top metal layer is then deposited, patterned and etched to form only the upper part of the source, the drain and the data line without increasing the thickness of the comb-shaped electrode.

Because of the thinner electrode and better rubbing, the IPS LCD of this invention has a very dark off-state which greatly increases the contrast of the display. A TN LCD typically operates with a normally white condition. An IPS LCD, on the contrary, operates with a normally black condition. Therefore, a dark off-state is very important for the IPS LCD because the display can have much higher contrast.

For an IPS LCD with a larger size and higher resolution, the pixel size has to be smaller. Consequently, if the thickness of the electrode is not decreased, the rubbing will become more difficult because of the smaller pixel. If the thickness of the upper metal layer is reduced without using the process of this invention, the resistance of the data line will be increased so that the driver circuit may no longer be able to drive it.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. An in-plane switching liquid crystal display comprising:

a gate of a thin-film transistor and a first electrode formed on a glass substrate;

an insulating layer above said gate, said first electrode and said substrate;

a device structure including a source and a drain of said thin-film transistor formed above said insulating layer, said source and said drain comprising a first conductive layer; and a second electrode formed by a conductive layer above said insulating layer, said second electrode being formed at a position horizontally different from the position of said first electrode for providing in-plane switching;

wherein said second electrode is sufficiently thinner than said first conductive layer of said drain and said source for allowing uniform rubbing.

2. The in-plane switching liquid crystal display according to claim 1, wherein said first conductive layer of said source and said drain comprises a top layer of aluminum and a bottom layer of Cr, and the conductive layer of said second electrode comprises a layer of Cr.

3. The in-plane switching liquid crystal display according to claim 1, wherein the thickness of the top layer of aluminum comprised in said first conductive layer is in the range from 500 angstroms to 1000 angstroms, the thickness of the bottom layer of Cr comprised in said first conductive layer is in the range from 1000 angstroms to 8000 angstroms, and the thickness of the layer of Cr comprised in said second electrode is in the range from 500 angstroms to 1000 angstroms.

4. A process of manufacturing an in-plane switching liquid crystal display comprising the steps of:

a. forming a gate of a thin-film transistor and a first electrode on a glass substrate;

b. depositing an insulating layer above said gate, said first electrode and said glass substrate; and c. forming a thin-film transistor structure and a second electrode above said insulating layer, said thin-film transistor structure having a source and a drain comprising a first conductive layer on top, and said second electrode comprising a second conductive layer;

wherein the thickness of said second conductive layer is substantially smaller than the thickness of said first conductive layer for allowing uniform rubbing in the area near said second electrode and said second electrode is formed in a position horizontally different from the position of said first electrode for providing in-plane switching.

5. The process of manufacturing an in-plane switching liquid crystal display according to claim 4, wherein said first conductive layer of said source and said drain comprises a top metal layer and a bottom metal layer, and said second conductive layer of said second electrode comprises only a metal layer.

6. The process of manufacturing an in-plane switching liquid crystal display according to claim 4, wherein said first conductive layer of said source and said drain comprises a top layer of aluminum and a bottom layer of Cr, and the conductive layer of said second electrode comprises a layer of Cr.

7. The process of manufacturing an in-plane switching liquid crystal display according to claim 6, wherein the thickness of the top layer of aluminum comprised in said first conductive layer is in the range from 500 angstroms to 1000 angstroms, the thickness of the bottom layer of Cr comprised in said first conductive layer is in the range from 1000 angstroms to 8000 angstroms, and the thickness of the layer of Cr comprised in said second electrode is in the range from 500 angstroms to 1000 angstroms.

8. The process of manufacturing an in-plane switching liquid crystal display according to claim 4, said step c. comprising the steps of:

d. forming above said insulating layer a second electrode and a thin-film transistor structure having a drain and a source, said drain, said source and said second electrode comprising a same conductive layer;

e. coating a photo-resist layer above said thin-film transistor structure and said second electrode;

f. patterning said photo-resist layer for exposing only said second electrode using a photo-lithographic technique;

g. etching and removing a portion of the conductive layer of said second electrode for reducing the thickness of said conductive layer; and h. removing said layer of photo-resist.

9. The process of manufacturing an in-plane switching liquid crystal display according to claim 8, wherein the conductive layer in said step (d) comprises a top metal layer and a bottom metal layer, and said step (g) removes the top metal layer of the conductive layer of said second electrode.

* * * * *

UNITED STATES PATENT AND TRADEMARK OFFICE
CERTIFICATE OF CORRECTION

PATENT NO.        : 6,163,355
APPLICATION NO.   : 09/211775
DATED             : December 19, 2000
INVENTOR(S)       : Shih-Chang Chang, Jr-Hong Chen and Biing-Der Liu It is certified that error appears in the above-identified patent and that said Letters Patent is hereby corrected as shown below:

Column 3, line 33, change "Cr layer" to --aluminum layer--.

Column 3, line 35, change "Al layer" to --Cr layer--.

Column 4, lines 50-51, change "top layer of aluminum" to --bottom layer of Cr--.

Column 4, line 53, change "bottom layer of Cr" to --top layer of aluminum--.

Column 5, line 24, change "top layer of aluminum" to --bottom layer of Cr--.

Column 5, line 26, change "bottom layer of Cr" to --top layer of aluminum--.

Signed and Sealed this

Second Day of November, 2010

David J. Kappos
*Director of the United States Patent and Trademark Office*